US011320037B2

(12) United States Patent
Makizoe et al.

(10) Patent No.: US 11,320,037 B2
(45) Date of Patent: May 3, 2022

(54) SPEED REDUCER

(71) Applicant: Nabtesco Corporation, Tokyo (JP)

(72) Inventors: Yoshiaki Makizoe, Tokyo (JP); John Verzemnieks, Tokyo (JP); Hideshi Shimada, Tokyo (JP)

(73) Assignee: NABTESCO CORPORATION, Tokyo (JP)

( * ) Notice: Subject to any disclaimer, the term of this patent is extended or adjusted under 35 U.S.C. 154(b) by 0 days.

(21) Appl. No.: 16/535,782

(22) Filed: Aug. 8, 2019

(65) Prior Publication Data

US 2020/0049247 A1 Feb. 13, 2020

(30) Foreign Application Priority Data

Aug. 9, 2018 (JP) .............................. JP2018-150070

(51) Int. Cl.
*F16H 57/028* (2012.01)
*F16H 57/00* (2012.01)
*F16H 1/28* (2006.01)

(52) U.S. Cl.
CPC ....... *F16H 57/028* (2013.01); *F16H 57/0006* (2013.01); *F16H 1/28* (2013.01)

(58) Field of Classification Search
CPC ........................... F16H 57/028; F16H 57/0006
See application file for complete search history.

(56) References Cited

U.S. PATENT DOCUMENTS

| | | | | |
|---|---|---|---|---|
| 5,197,930 A | * | 3/1993 | Imase | ..................... F16H 25/06 475/168 |
| 5,873,786 A | * | 2/1999 | Hosoya | ..................... F16F 7/00 464/73 |
| 2015/0015056 A1 | | 1/2015 | Yamamoto et al. | |
| 2015/0369297 A1 | * | 12/2015 | Graf | .......................... F16D 3/56 464/81 |
| 2020/0049247 A1 | * | 2/2020 | Makizoe | ................... F16H 1/32 |

FOREIGN PATENT DOCUMENTS

| | | |
|---|---|---|
| DE | 1135256 B | 8/1962 |
| JP | 2014-084989 A | 5/2014 |
| JP | 5564352 B2 * | 7/2014 |
| JP | 2017-150609 A | 8/2017 |

OTHER PUBLICATIONS

Extended European Search Report EP Application No. 19190997.7 dated Oct. 24, 2019.
Communication pursuant to Article 94(3) EPC dated Oct. 13, 2020, issued in corresponding European Patent Application No. 19190997.7 (7 pgs ).
Office Action dated Jul. 16, 2021, issued in corresponding European Patent Application No. 19190997.7 (7 pgs.).

* cited by examiner

*Primary Examiner* — Vicky A Johnson
(74) *Attorney, Agent, or Firm* — Pillsbury Winthrop Shaw Pittman, LLP

(57) ABSTRACT

One object is to provide a speed reducer that can absorb or relieve an impact acting thereon. A speed reducer of the present invention includes: a speed reducing unit a housing that houses the speed reducing unit and a shock absorbing means that allows the speed reducing unit to move with respect to the housing in a direction of a rotary shaft of the speed reducing unit.

12 Claims, 4 Drawing Sheets

SPEED REDUCER

CROSS-REFERENCE TO RELATED APPLICATIONS

This application is based on and claims the benefit of priority from Japanese Patent Application Serial No. 2018-150070 (filed on Aug. 9, 2018), the contents of which are hereby incorporated by reference in its entirety.

TECHNICAL FIELD

The present invention relates to a speed reducer that can absorb or relieve an impact.

BACKGROUND

Various speed reducers have been known as a technical element essential to operations of industrial robots. Such speed reducers are required to have less backlash. For example, speed reducers known to have less backlash include planetary gear speed reducers, eccentric oscillating speed reducers, and strain wave gearing speed reducers. In particular, strain wave gearing speed reducers, which have a high reduction ratio, a light weight, and a small size, in addition to less backlash, are widely used in the field of industrial robots.

A strain wave gearing speed reducer is disclosed in Japanese Patent Application Publication No. 2014-084989 ("the '989 Publication").

In a strain wave gearing speed reducer as disclosed in the '989 Publication, a flex spline is bent into an elliptical shape by a wave generator, and teeth of the flex spline are engaged at a long axis portion thereof with inner teeth of an outer ring. Therefore, an external impact acting on the strain wave gearing speed reducer causes improper engagement of the teeth (loss of synchronism).

An industrial robot is subjected to unexpected impacts from various directions. Such impacts may cause loss of synchronism in the strain wave gearing speed reducer, in addition to damage of the gears.

SUMMARY

The present invention addresses the above-described circumstances, and an object thereof is to provide a speed reducer that can absorb or relieve an impact acting thereon.

A speed reducer according to an embodiment of the present invention comprises: a speed reducing unit a housing that houses the speed reducing unit; and a shock absorbing unit that allows the speed reducing unit to move with respect to the housing in a direction of a rotary shaft of the speed reducing unit.

In the speed reducer according to an embodiment of the present invention, the shock absorbing unit is an elastic member disposed between the speed reducing unit and the housing. In the speed reducer according to an embodiment of the present invention, the elastic member is formed of rubber.

In the speed reducer according to an embodiment of the present invention, the elastic member has a spherical shape. In the speed reducer according to an embodiment of the present invention, the elastic member includes a spherical portion having a spherical shape.

In the speed reducer according to an embodiment of the present invention, the speed reducing unit is capable of moving with respect to the housing in a circumferential direction of a rotary shaft of the speed reducing unit.

A speed reducer according to an embodiment of the present invention comprises: a speed reducing unit a housing that houses the speed reducing unit; and an elastic member disposed between the speed reducing unit and the housing. The elastic member includes a spherical portion having a spherical shape, and the speed reducing unit is capable of moving with respect to the housing in a direction of a rotary shaft of the speed reducing unit and a circumferential direction of the rotary shaft of the speed reducing unit.

In the speed reducer according to an embodiment of the present invention, the speed reducing unit includes a recess or a projection, the recess receiving the elastic member, the projection being received in the elastic member. A speed reducer according to an embodiment of the present invention is housed in a housing and comprises a recess or a projection, the recess receiving an elastic member, the projection being received in the elastic member, the elastic member being disposed between the speed reducing unit and the housing.

Advantages

According to an embodiment of the present invention, a speed reducer can be provided that is configured to absorb or relieve an impact acting thereon, less prone to loss of synchronism and damage to the gears, and capable of safe and reliable operation.

DESCRIPTION OF THE EMBODIMENTS

Embodiments of the present invention will now be described with reference to the appended drawings.

Figure 1:
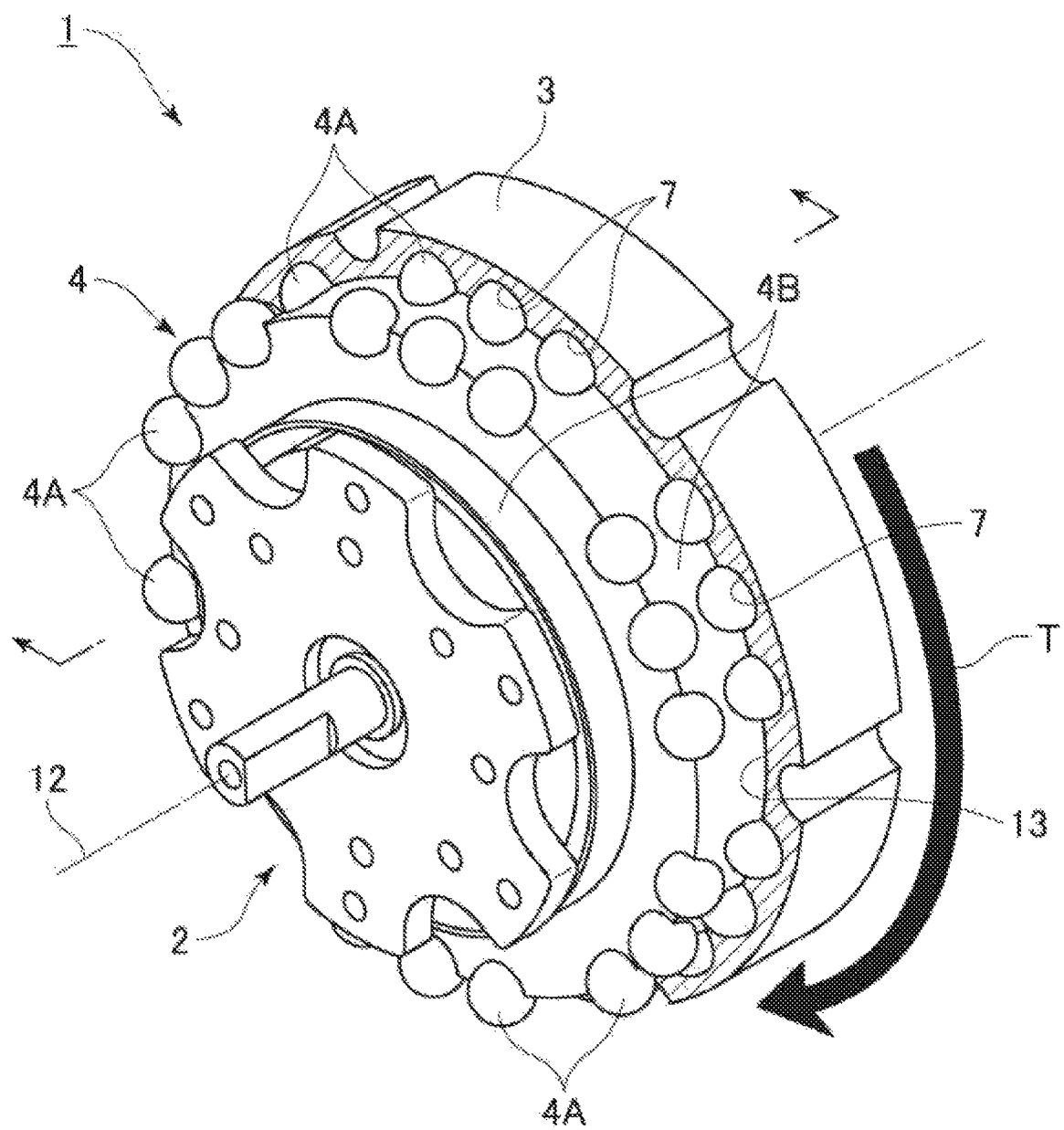
FIG. 1 is a schematic view of a speed reducer according to an embodiment of the present invention.

FIG. 1 is a schematic view of a speed reducer 1 according to an embodiment of the present invention. The speed reducer 1 according to the embodiment of the present invention includes a speed reducing unit (also referred to as "a speed reducing portion") 2, a housing 3 that houses the speed reducing unit 2, and a shock absorbing means 4 provided between the housing 3 and the speed reducing unit 2. In the example shown, a part of the housing 3 that houses the speed reducing unit 2 is not shown for illustration of the shock absorbing means 4.

The speed reducing unit 2, disposed between an input rotary shaft and an output rotary shaft, reduces a rotation speed of an output relative to an input. The shock absorbing means 4 absorbs excess loads on a rotary shaft 12 of the speed reducing unit 2 to prevent damage to components of the speed reducing unit 2 such as gears.

The speed reducer 1 according to the embodiment of the present invention includes the speed reducing unit 2 and the housing 3 that houses the speed reducing unit 2, and the speed reducing unit 2 is capable of moving with respect to the housing 3 in the direction of the rotary shaft of the speed reducing unit 2 (that is, the direction along the rotary shaft). As described above, the speed reducer 1 may include the shock absorbing means 4. The speed reducing unit 2 is capable of moving with respect to the housing 3 in the direction of the rotary shaft of the speed reducing unit 2.

Thus, when an impact acts on the housing 3, the housing moves in the direction of the rotary shaft to relieve the impact.

The speed reducing unit may be, for example, an eccentric oscillating speed reducing unit. In an eccentric oscillating speed reducing unit, the input rotary shaft is connected to a crank, and the crank is connected to a planetary gear. When the input rotary shaft rotates, the planetary gear, which has wave-shaped teeth contacted with a metal inner gear having a wave-shaped contact surface, rotates while revolving in a direction counter to the rotational direction. This rotation is withdrawn by six inner pins. The six inner pins are arranged in a circle concentric with the input rotary shaft, such that the input rotary shaft and the output rotary shaft are concentric.

The housing 3 is fixed to, for example, a base side or an arm side of a joint of a robot. The input rotary shaft is a rotary shaft that receives a power produced by a motor, and the output rotary shaft is a rotary shaft that outputs a reduced rotational movement in accordance with the input rotation speed. The rotary shaft 12 shown is an example of the output rotary shaft. For example, an industrial robot includes a plurality of speed reducers and a pair of arms connected together via the speed reducers. One of the arms is capable of moving with respect to the other arm.

Since the housing 3 is fixed to a base side or an arm side of a joint, the other side can be moved relatively. For example, when the speed reducer 1 is used in a joint of an industrial robot, the housing 3 is fixed to the upper or arm side as the input rotary shaft side, such that the lower or base side as the output rotary shaft side can move with respect to the upper or arm side.

As shown in FIG. 1, the shock absorbing means 4 is disposed to encircle the side region of the speed reducing unit 2 (more specifically, a case 5 of the speed reducing unit 2 (described later)). The housing 3 further encircles the shock absorbing means 4 to house the speed reducing unit 2 and the shock absorbing means 4. Thus, even when the speed reducer 1 receives an external impact for example, the shock absorbing means 4 can prevent the speed reducing unit 2 from colliding with the housing 3, thereby reducing loss of synchronism in the speed reducing unit 2 and damage to the gears.

The speed reducer 1 according to one embodiment of the present invention includes an elastic member as the shock absorbing means 4 (hereinafter also referred to as "the elastic member 4") between the speed reducing unit 2 and the housing 3. The shock absorbing means 4 is not necessarily formed of the elastic member. When the shock absorbing means 4 is formed of the elastic member, the elastic member 4 disposed between the speed reducing unit 2 and the housing 3 relieves an external impact on the speed reducing unit 2. The elastic member 4 may be formed so as to hardly bend in normal operation of the speed reducer 1. The elastic member 4 may be formed so as to bend when the speed reducer 1 receives a sudden external impact or the like. Thus, the elastic member 4 can absorb an external impact so as not to affect the normal operation of the speed reducer 1.

Figure 2:
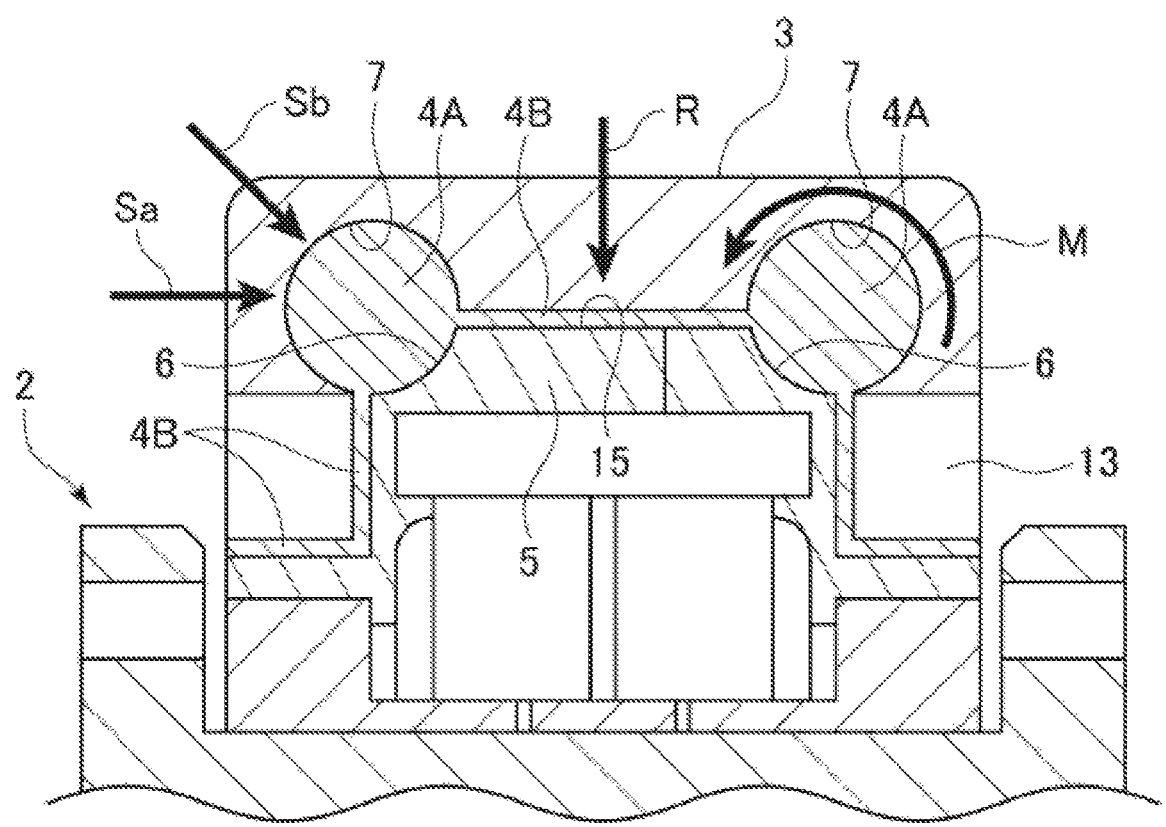
FIG. 2 is a view explaining details of a shock absorbing means of the speed reducer according to the embodiment of the present invention.

Next, the shock absorbing means 4 is described in more detail with reference to FIG. 2. FIG. 2 is a sectional view cut along a plane extending through the rotary shaft 12 of the speed reducing unit 2 shown in FIG. 1. As shown, the elastic member 4 of the speed reducer 1 according to an embodiment of the present invention is partially formed in a spherical shape. In the example shown, two spherical elastic members 4A, arranged in the left-right direction of the drawing, are fitted in grooves 6 formed in an outer circumferential surface 15 of the case 5 of the speed reducing unit 2 and grooves 7 formed in an inner circumferential surface 13 of the housing 3.

As shown in FIG. 2, the elastic member 4 of the speed reducer 1 according to the embodiment of the present invention includes spherical elastic members 4A and a sheet-shaped elastic member 4B disposed between the outer circumferential surface 15 of the case 5 of the speed reducing unit 2 and the inner circumferential surface 13 of the housing 3. It is also possible that the elastic member 4 of the speed reducer 1 according to the embodiment of the present invention is formed only of the spherical elastic members 4A or formed only of the sheet-shaped elastic member 4B.

A plurality of spherical elastic members 4A are formed between the speed reducing unit 2 and the housing 3.

Since a part of the elastic member 4 is formed of the spherical elastic members 4A, the elastic member 4 can have a small size.

The elastic member 4 of the speed reducer 1 according to the embodiment of the present invention may be formed of rubber or other conventionally known materials as appropriate.

In the speed reducer 1 according to the embodiment of the present invention, the speed reducing unit 2 is capable of moving with respect to the housing 3 in the circumferential direction of the rotary shaft of the speed reducing unit. This relieves an impact in the circumferential direction.

The speed reducer 1 according to an embodiment of the present invention includes the speed reducing unit 2, the housing 3 that houses the speed reducing unit 2, and the elastic member 4 disposed between the speed reducing unit 2 and the housing 3. The elastic member 4 includes spherical portions 4A formed in a spherical shape, and the speed reducing unit 2 is capable of moving with respect to the housing 3 in the direction of the rotary shaft 12 of the speed reducing unit 2 and the circumferential direction of the rotary shaft 12 of the speed reducing unit 2.

The elastic member 4 of the speed reducer 1 according to an embodiment of the present invention is formed spherical as a whole or includes spherical elastic portions 4A formed spherical. In this way, at least a part of the elastic member 4 is formed spherical, and therefore, it is possible to relieve impacts acting from any of the radial direction (R), the torque direction (T), the moment direction (M), and the thrust directions (Sa, Sb) shown in FIGS. 1 and 2.

Figure 3:
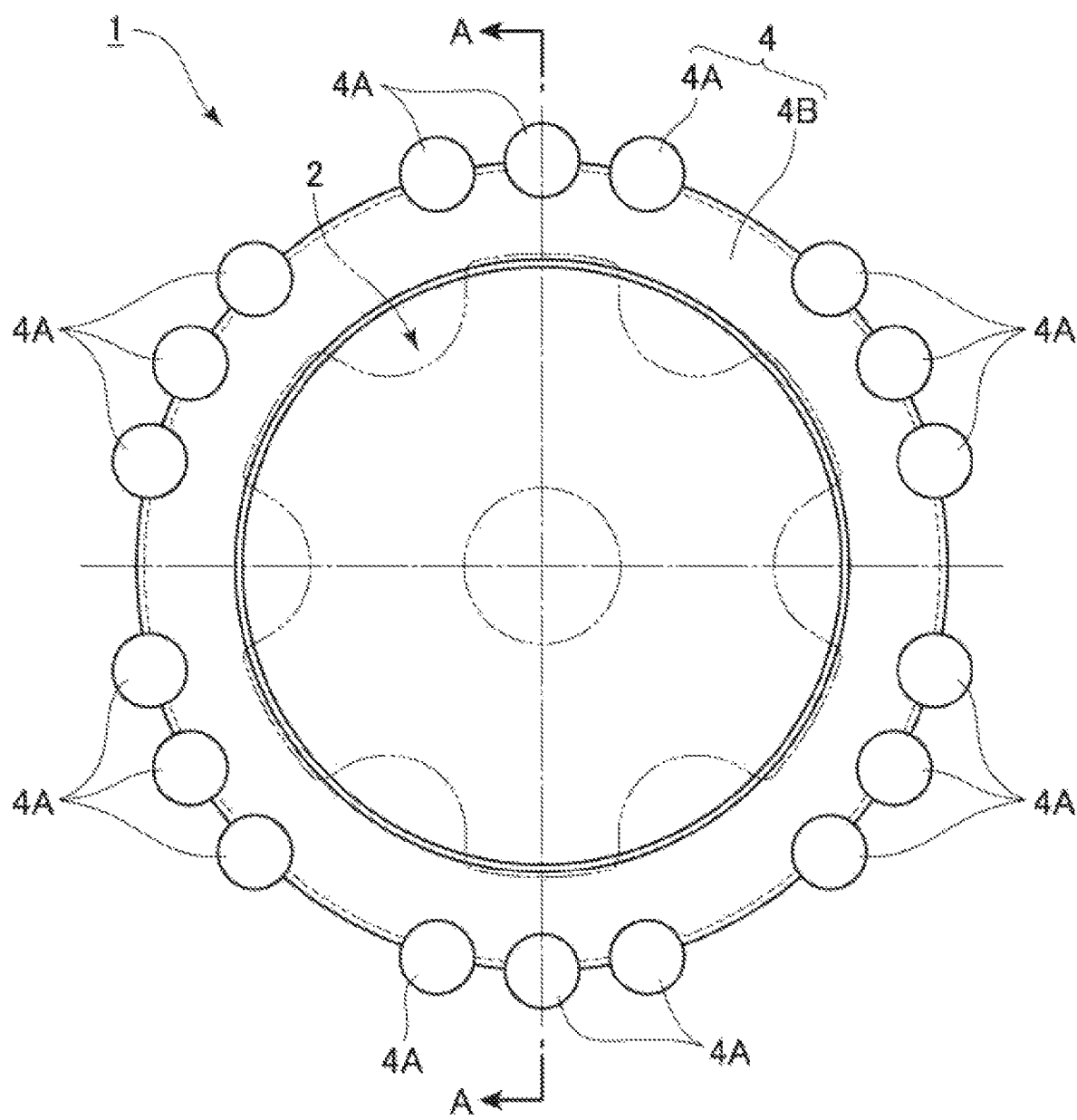
FIG. 3 shows an elastic member of the speed reducer according to the embodiment of the present invention as viewed in the top-bottom direction of the speed reducer.

Next, with reference to FIG. 3, a description is given of the elastic member 4 of the speed reducer 1 according to the embodiment of the present invention as viewed in the top-bottom direction of the speed reducer 1. In FIG. 3, the housing 3 is not shown.

As shown, the speed reducer 1 includes the speed reducing unit 2 (shown in a simplified manner) disposed in the middle portion and the elastic member 4 disposed around the speed reducing unit 2. The elastic member 4 includes a plurality of spherical elastic members 4A and the sheet-shaped elastic member 4B. The speed reducer 1 shown includes 18 spherical elastic members 4A arranged along the circumferential direction of the speed reducing unit 2. As shown in FIG. 4A, there are two rows of the spherical elastic members 4A each including 18 spherical elastic members 4A arranged in the circumferential direction, and therefore, the speed reducer 1 includes 36 spherical elastic members 4A in total.

Figure 4:
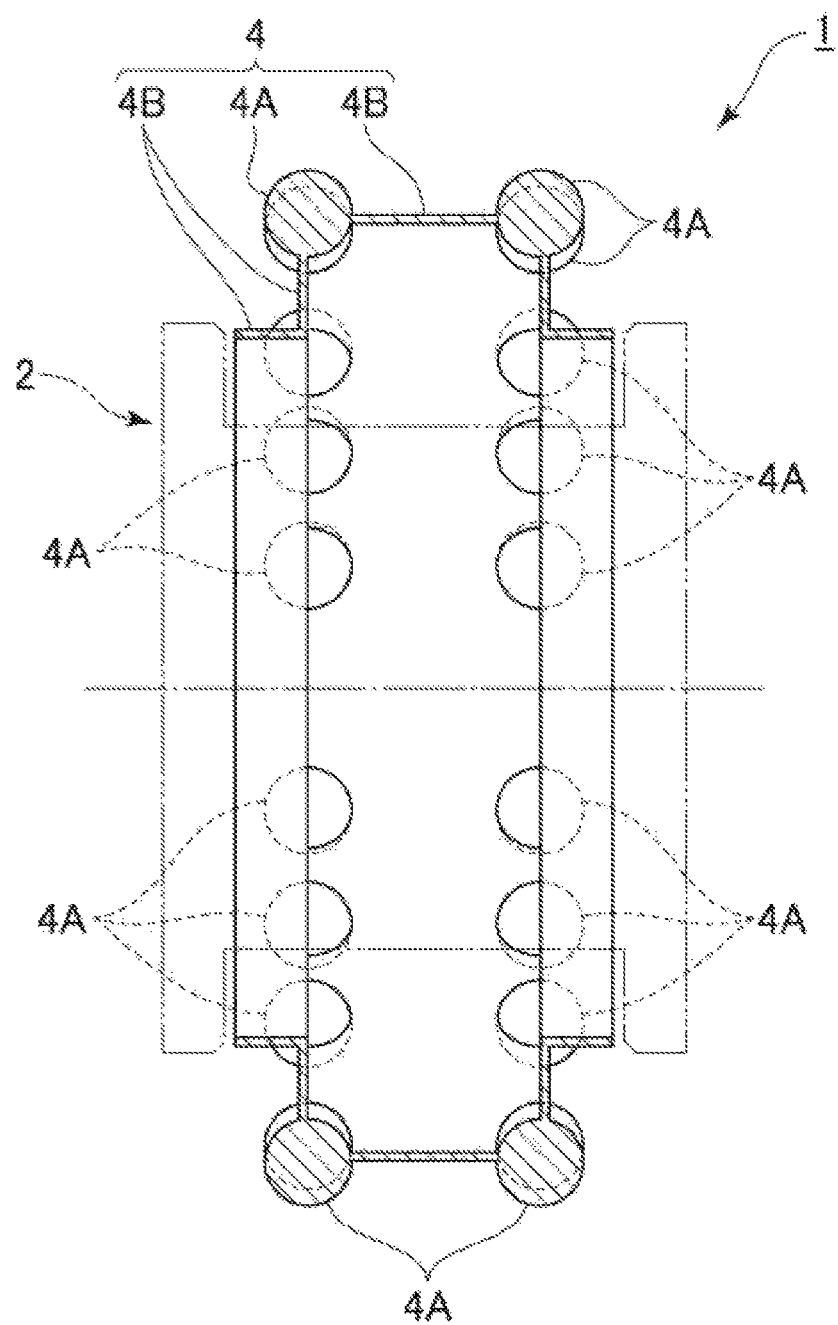
FIG. 4 shows the elastic member of the speed reducer according to the embodiment of the present invention as viewed in the section along the line A-A of FIG. 3.

FIG. 4 shows the section of the speed reducer 1 along the line A-A in FIG. 3. In FIG. 4, the housing 3 is not shown.

In the example shown in FIGS. 3 and 4, the elastic member 4 of the speed reducer 1 according to an embodiment of the present invention includes 36 spherical elastic members 4A and the sheet-shaped elastic member 4B. The number, size, and shape of the spherical elastic members 4A are not limited in any way and are susceptible of modification as appropriate. Further, the size and shape of the sheet-shaped elastic member 4B are also susceptible of modification as appropriate.

As described above, the elastic member 4 of the speed reducer 1 according to an embodiment of the present invention can relieve impacts acting from any of the radial direction (R), the torque direction (T), the moment direction (M), and the thrust directions (Sa, Sb) shown in FIGS. 1 and 2.

In the speed reducer 1 according to an embodiment of the present invention, impacts acting on the speed reducer 1 can be absorbed or relieved by the shock absorbing means 4 (the elastic member 4). Therefore, when the speed reducer 1 is a strain wave gearing speed reducer, it is possible to prevent loss of synchronism and damage to the gears.

The examples of the embodiments of the present invention have been described above. The above-described various embodiments are not limited to the configurations described above and can be applied to various types of speed reducers. Some of the various features described for any one of the above-described various embodiments may be applied to the speed reducer described for another of the embodiments.

What is claimed is:

1. A speed reducer comprising:
a speed reducing unit;
a housing that houses the speed reducing unit; and
a shock absorbing unit disposed between the speed reducing unit and the housing both in an axial direction of a rotary shaft of the speed reducing unit and in a radial direction perpendicular to the axial direction, the shock absorbing unit configured and arranged to allow the speed reducing unit to move with respect to the housing at least in the axial direction of the rotary shaft of the speed reducing unit,
wherein, in a cross-sectional view taken along a plane extending through the rotary shaft of the speed reducing unit, the housing includes side walls that are spatially separated from each other along the axial direction of the rotary shaft of the speed reducing unit and an opening disposed between the side walls,
wherein, in the cross-sectional view taken along the plane extending through the rotary shaft of the speed reducing unit, the speed reducing unit includes a protrusion portion, at least a part of the protrusion portion being disposed between the side walls in the axial direction of the rotary shaft of the speed reducing unit,
wherein the opening of the housing is configured to receive the protrusion portion of the speed reducing unit, and
wherein at least a portion of the shock absorbing unit is disposed between the protrusion portion of the speed reducing unit and of each of the side walls of the housing when the protrusion portion of the speed reducing unit is received by the opening of the housing,
wherein the speed reducing unit includes flange portions that are spatially separated from each other along the axial direction of the rotary shaft of the speed reducing unit,
wherein the protrusion portion is disposed between flange portions and extending outwardly away from the flange portions,
wherein the side walls of the housing confront the flange portions of the speed reducing unit when the protrusion portion of the speed reducing unit is received by the opening of the housing, and
wherein at least another portion of the shock absorbing unit is disposed between confronting surfaces of the flange portions of the speed reducing unit and the side walls of the housing.

2. The speed reducer of claim 1, wherein the shock absorbing unit is an elastic member disposed between the speed reducing unit and the housing.

3. The speed reducer of claim 2, wherein the elastic member includes a spherical portion having a spherical shape.

4. The speed reducer of claim 2, wherein the elastic member is formed of rubber.

5. The speed reducer of claim 1, wherein the speed reducing unit is configured to move with respect to the housing in a circumferential direction of the rotary shaft of the speed reducing unit.

6. The speed reducer of claim 1, wherein the shock absorbing unit includes two spherical elastic members.

7. The speed reducer of claim 1, wherein the shock absorbing unit includes a sheet-shaped elastic member.

8. The speed reducer of claim 1, wherein the shock absorbing unit includes two spherical elastic members and a sheet-shaped elastic member.

9. The speed reducer of claim 1, wherein at least the portion of the shock absorbing unit is disposed between an outer peripheral surface of the protrusion portion of the speed reducing unit and an inner peripheral surface of the opening of the housing when the protrusion portion of the speed reducing unit is received by the opening of the housing.

10. The speed reducer of claim 9, wherein the outer peripheral surface of the protrusion portion of the speed reducing unit and the inner peripheral surface of the opening of the housing includes a grooves formed therein, and wherein the grooves are configured to receive at least the portion of the shock absorbing unit therein.

11. The speed reducer of claim 1, wherein at least the portion of the shock absorbing unit is disposed around the entire periphery of the protrusion portion of the speed reducing unit when the protrusion portion of the speed reducing unit is received by the opening of the housing.

12. A speed reducing unit housed in a housing, in a cross-sectional view taken along a plane extending through a rotary shaft of the speed reducing unit, the housing includes side walls that are spatially separated from each other along the axial direction of the rotary shaft of the speed reducing unit and an opening disposed between the side walls,
the speed reducing unit comprising a recess configured to receive an elastic member or a projection configured to being received in the elastic member, and the elastic member being disposed between the speed reducing unit and the housing both in an axial direction of the rotary shaft of the speed reducing unit and in a radial direction perpendicular to the axial direction, the elastic member configured and arranged to allow the speed reducing unit to move with respect to the housing at least in the axial direction of the rotary shaft of the speed reducing unit, wherein, in the cross-sectional view taken along the plane extending through the rotary shaft of the speed reducing unit, the speed reducing unit includes a protrusion portion, at least a part of the protrusion portion being disposed between the side walls in the axial direction of the rotary shaft of the speed reducing unit, and wherein at least a portion of the elastic member is disposed between the protrusion portion of the speed reducing unit and of each of the side walls of the housing when the protrusion portion of the speed reducing unit is received by the opening of the housing, wherein the recess or the projection of the speed reducing unit is disposed on the protrusion portion.

\* \* \* \* \*